US011042879B1

(12) United States Patent
Loucks et al.

(10) Patent No.: US 11,042,879 B1
(45) Date of Patent: Jun. 22, 2021

(54) USER-LOCK BROWSER EXTENSION

(71) Applicant: Capital One Services, LLC, McLean, VA (US)

(72) Inventors: Eric Loucks, Tysons, VA (US); Lukiih Cuan, Washington, DC (US); Joshua Edwards, Philadelphia, PA (US)

(73) Assignee: Capital One Services, LLC, McLean, VA (US)

( * ) Notice: Subject to any disclaimer, the term of this patent is extended or adjusted under 35 U.S.C. 154(b) by 0 days.

(21) Appl. No.: 16/742,323

(22) Filed: Jan. 14, 2020

(51) Int. Cl.
| G06F 16/904 | (2019.01) |
| G06Q 20/40 | (2012.01) |
| G06F 40/14 | (2020.01) |
| G06F 11/34 | (2006.01) |

(52) U.S. Cl.
CPC ... *G06Q 20/40145* (2013.01); *G06F 11/3438* (2013.01); *G06F 16/904* (2019.01); *G06F 40/14* (2020.01)

(58) Field of Classification Search
CPC .............. G06Q 20/40145; G06Q 40/00; G06F 16/904; G06F 40/14; G06F 11/3438
See application file for complete search history.

(56) References Cited

U.S. PATENT DOCUMENTS

2013/0042111 A1* 2/2013 Fiske ...................... G06F 21/32
726/6

OTHER PUBLICATIONS

The University of Alaska staff, Managing Finance Reports with Vista Plus, Aug. 2008, The University of Alaska, web, 2-20 (Year: 2008).*

* cited by examiner

*Primary Examiner* — I Jung Liu
(74) *Attorney, Agent, or Firm* — Banner & Witcoff, Ltd.

(57) ABSTRACT

Methods and systems described herein may monitor, by a browser, activity of a user within a web page displayed by the browser. Based on detecting, by the browser, an attempt by the first user to perform a financial transaction with an online vendor and associated with a financial account, biometric information associated with the user may be captured by the browser. Based on the captured biometric information, the browser may determine whether the first user is authorized to perform financial transactions with the online vendor and associated with the financial account. Based on a determination that the user is not authorized to perform the financial transaction, the browser may modify at least one element of the webpage to block the user from performing the financial transaction with the online vendor.

20 Claims, 6 Drawing Sheets

USER-LOCK BROWSER EXTENSION

FIELD OF USE

Aspects described herein generally relate to web browsers, and hardware and software related thereto. More specifically, one or more aspects describe herein provide a user locking browser extension.

BACKGROUND

A web browser is software that allows a user to find and view websites on the World Wide Web. A web browser may provide a User Interface (UI) for viewing and navigating the websites. A website may include one or more web pages. A web page (or webpage) is a document commonly written in Hypertext Markup Language (HTML). In addition to HTML, a web page may include references to resources, such as images, Cascading Style Sheets (CSS) and/or scripts, such as JavaScript.

A browser engine (also referred to as a rendering engine or layout engine) is a component of a web browser that transforms the HTML document and other resources of a web page into a visual representation within the browser's User Interface (UI). When the browser receives a HTML document, the browser engine parses the HTML document and builds or constructs a DOM (Document Object Model) for the web page. The DOM is an object-oriented representation of the HTML document. The DOM acts as an interface to the HTML document. Programs and scripts, such as JavaScript, can dynamically access and update the content, structure and style of the web page document by interfacing with the DOM of the web page.

A browser extension is a software module for customizing a web browser. Browser extensions may be created using HTML, JavaScript, and CSS. A browser extension may, for example, dynamically modify the browser's UI, modify web page content, and block ads from being displayed by the browser.

Online accounts may be secured using passwords and/or other two-step identification and multifactor authentication processes. However, the associated security questions and passwords that need to be remembered can make these processes overwhelming and cumbersome for users. Moreover, there is no guarantee of safety with two-step verification or multifactor authentication because hackers or the like may use 'digital signature' patterns to break into user accounts and steal sensitive information or perform unauthorized financial transactions.

SUMMARY

The following presents a simplified summary of various aspects described herein. This summary is not an extensive overview, and is not intended to identify key or critical elements or to delineate the scope of the claims. The following summary merely presents some concepts in a simplified form as an introductory prelude to the more detailed description provided below. Corresponding apparatus, systems, and computer-readable media are also within the scope of the disclosure.

Biometrics allows a person to be identified and authenticated based on a set of recognizable and verifiable data, which are unique and specific to that person. Biometrics are less prone to manipulation than passwords and/or other two-step identification and two-factor authentication processes, and thus provide a safer alternative to passwords. Biometric authentication answers the question "Is this really person X?" A reference set of biometric data for a person may be stored in a database. In order to verify or authenticate a person's identity, the person's biometric data is captured and then compared to the person's stored reference set of biometric data. Biometric identification answers the question "Who is this person?" In order to determine the identity of a person, biometric data for the person may be captured and then compared to the stored biometric data of several other persons. The data can be a photo, a voice sample, or a fingerprint. Biometric identification using a fingerprint, face, or voice provides a higher degree of certainty of a user's identity than passwords and/or other two-step identification and two-factor authentication processes thus, provides significantly safer security and convenience.

Implementations described herein provide a browser extension that causes a browser to, based on biometrics (e.g., facial recognition, fingerprint recognition, voice recognition, iris scan, etc.), detect an attempted financial transaction or other browser activity by an unauthorized user. The financial transaction may be with an online vendor and associated with a financial account. The browser may take steps to prevent unauthorized financial transactions associated with the financial account by manipulating a web page displayed by the browser, for example, by disabling various user selectable options and controls, and hiding content within the web page.

Implementations described herein enable online activity to be moderated. For example, a parent may wish to block specific content when a child is browsing online. A browser extension for a browser may identify a user of the browser based on capturing biometric data for the user. Based on the biometric data, the browser may modify or hide DOM elements of web pages in order to block or restrict web content that the parent may not wish for the child to access and/or view, including content associated with products for sale. Additionally, a browser extension may cause a browser to detect, based on biometric data, that a user of the browser is not authorized to perform an attempted financial transaction. The browser extension may modify or hide DOM elements of web pages related to default checkout options on e-commerce sites, in order to secure financial accounts from unauthorized financial transactions. According to some implementations, based on receiving a notification of an unauthorized user attempting a financial transaction within a browser, vendor-specific virtual numbers may be used to selectively enable or disable a financial account owner's financial accounts to allow or block the transaction.

Methods and systems as described herein may include a computer-implemented method that includes monitoring, by a browser, activity of a first user within a first web page displayed by the browser. The method also includes detecting, by the browser and based on the monitored activity, an attempt by the first user to perform a first financial transaction with an online vendor and associated with a financial account. The method includes capturing, by the browser and based on detecting the attempt to perform the first financial transaction, biometric information associated with the first user. The method includes determining, by the browser and based on the captured biometric information, whether the first user is authorized to perform financial transactions with the online vendor and associated with the financial account. The method also includes modifying, by the browser and based on a determination that the first user is not authorized to perform the first financial transaction, at least one element of the first webpage to block the first user from performing the first financial transaction with the online vendor.

Methods and systems as described herein may include an apparatus that includes one or more processors, and memory storing instructions that, when executed by the one or more processors, cause the apparatus to display, via a browser executing on the apparatus, a web page accessed by a user the browser. The web page is associated with a first online vendor. The memory storing instructions, when executed by the one or more processors, also cause the apparatus to determine, via the browser executing on the apparatus, whether the first online vendor has been pre-identified for monitoring. The memory storing instructions, when executed by the one or more processors, also cause the apparatus to capture, via the browser executing on the apparatus and based on a determination that the first online vendor has been pre-identified for monitoring, biometric data associated with the user of the browser. The memory storing instructions, when executed by the one or more processors, also cause the apparatus to determine, based on the captured biometric data, whether the user of the browser is authorized to perform a financial transaction with the online vendor. The memory storing instructions, when executed by the one or more processors, also cause the apparatus to, based on a determination that the user is unauthorized, modify a plurality of elements of the web page associated with performing a financial transaction.

Methods and systems as described herein may include a non-transitory machine-readable medium storing instructions that, when executed by one or more processors, cause the one or more processors to perform steps that include monitoring, by a browser and based on a determination that a first web page accessed by a first user of the browser is associated with at least one of a plurality of websites or a plurality of online vendors pre-identified for monitoring, activity of the first user within the first web page. The steps include detecting, by the browser and based on the monitored activity, an attempt by the first user to perform a first financial transaction with an online vendor and associated with a financial account. The steps include capturing, by the browser and based on detecting the attempt to perform the first financial transaction, biometric information associated with the first user. The captured biometric information associated with the first user may include at least one image of a face of the first user of the browser. The steps include determining, by the browser and based on the captured biometric information and biometric data associated with one or more users that are pre-authorized to perform one or more financial transactions with the online vendor and associated with the financial account, whether the first user is authorized to perform financial transactions with the online vendor and associated with the financial account. The steps also include based on the determination, by the browser, that the first user is not authorized to perform the first financial transaction, disabling or hiding, by the browser and based on modifying a DOM representation of the first web page, at least one element of the first web page to block the first user from performing the first financial transaction with the online vendor, sending, by the browser, a notification of the attempted first financial transaction to an account holder associated with the financial account. The notification sent to the account holder includes at least a portion of the captured biometric information of the first user, and displaying, by the browser, a notification that the first user is not authorized to perform the attempted first financial transaction.

BRIEF DESCRIPTION OF THE DRAWINGS

The present disclosure is described by way of example and not limited in the accompanying figures in which like reference numerals indicate similar elements and in which.

DETAILED DESCRIPTION

In the following description of the various embodiments, reference is made to the accompanying drawings, which form a part hereof, and in which is shown by way of illustration various embodiments in which aspects of the disclosure may be practiced. It is to be understood that other embodiments may be utilized and structural and functional modifications may be made without departing from the scope of the present disclosure. Aspects of the disclosure are capable of other embodiments and of being practiced or being carried out in various ways. In addition, it is to be understood that the phraseology and terminology used herein are for the purpose of description and should not be regarded as limiting. Rather, the phrases and terms used herein are to be given their broadest interpretation and meaning.

Figure 1:
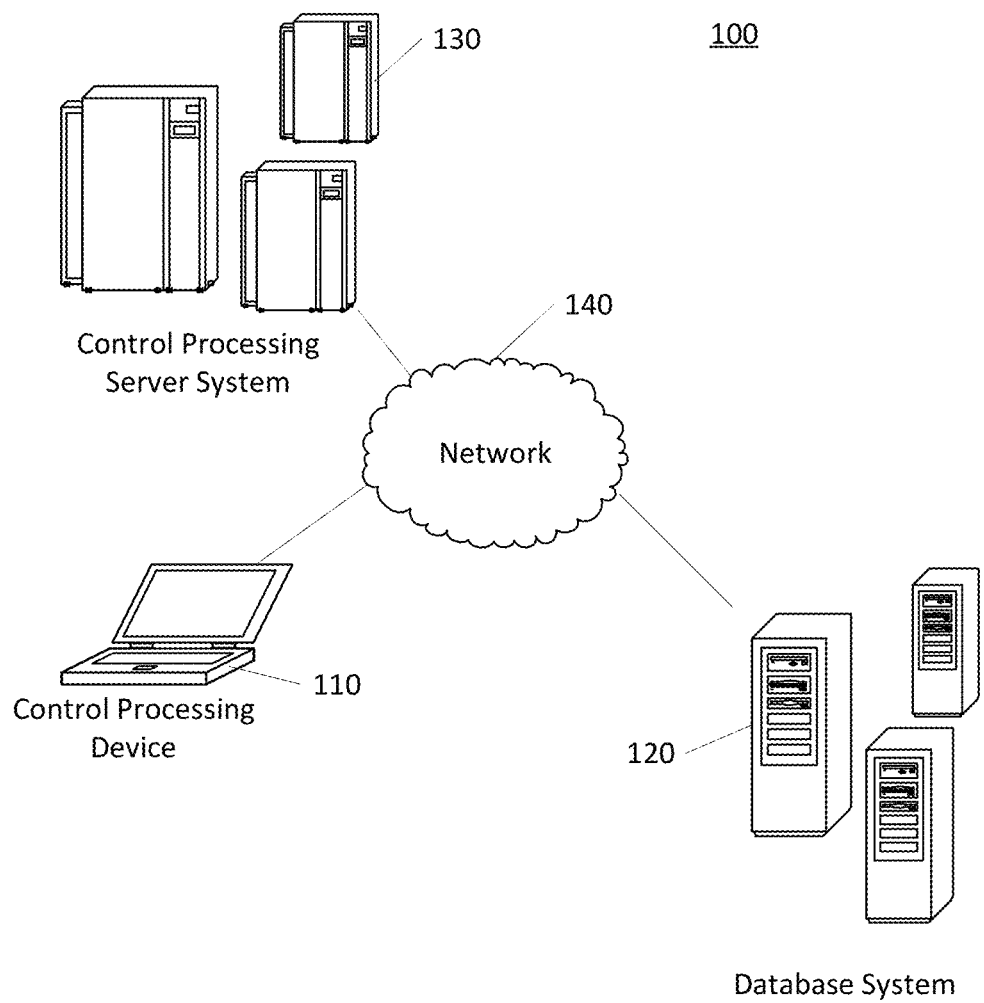
FIG. 1 shows an example of a control processing system in which one or more aspects described herein may be implemented.

FIG. 1 shows a system 100. The system 100 may include at least one client device 110, at least one database system 120, and/or at least one server system 130 in communication via a network 140. It will be appreciated that the network connections shown are illustrative and any means of establishing a communications link between the computers may be used. The existence of any of various network protocols such as TCP/IP, Ethernet, FTP, HTTP and the like, and of various wireless communication technologies such as GSM, CDMA, WiFi, and LTE, is presumed, and the various computing devices described herein may be configured to communicate using any of these network protocols or technologies. Any of the devices and systems described herein may be implemented, in whole or in part, using one or more computing systems described with respect to FIG. 2.

Client device 110 may access server applications and/or resources using one or more client applications (not shown) as described herein. Client device 110 may be a mobile device, such as a laptop, smart phone, or tablet, or computing devices, such as a desktop computer or a server. Alternatively, client device 110 may include other types of devices, such as game consoles, camera/video recorders, video players (e.g., incorporating DVD, Blu-ray, Red Laser, Optical, and/or streaming technologies), smart TVs, and other network-connected appliances, as applicable.

Database system 120 may be configured to maintain, store, retrieve, and update information for server system 130. Further, database system may provide server system 130 with information periodically or upon request. In this regard, database system 120 may be a distributed database capable of storing, maintaining, and updating large volumes of data across clusters of nodes. Database system 120 may provide a variety of databases including, but not limited to, relational databases, hierarchical databases, distributed databases, in-memory databases, flat file databases, XML databases, NoSQL databases, graph databases, and/or a combination thereof.

Server system 130 may be configured with a server application (not shown) that is capable of interfacing with client application and database system 120 as described herein. In this regard, server system 130 may be a stand-alone server, a corporate server, or a server located in a server farm or cloud-computer environment. According to some examples, server system 130 may be a virtual server hosted on hardware capable of supporting a plurality of virtual servers.

Network 140 may include any type of network. For example, network 140 may include a local area network (LAN), a wide area network (WAN), a wireless telecommunications network, and/or any other communication network or combination thereof. It will be appreciated that the network connections shown are illustrative and any means of establishing a communications link between the computers may be used. The existence of any of various network protocols such as TCP/IP, Ethernet, FTP, HTTP and the like, and of various wireless communication technologies such as GSM, CDMA, WiFi, and LTE, is presumed, and the various computing devices described herein may be configured to communicate using any of these network protocols or technologies.

The data transferred to and from various computing devices in a system 100 may include secure and sensitive data, such as confidential documents, customer personally identifiable information, and account data. Therefore, it may be desirable to protect transmissions of such data using secure network protocols and encryption, and/or to protect the integrity of the data when stored on the various computing devices. For example, a file-based integration scheme or a service-based integration scheme may be utilized for transmitting data between the various computing devices. Data may be transmitted using various network communication protocols. Secure data transmission protocols and/or encryption may be used in file transfers to protect the integrity of the data, for example, File Transfer Protocol (FTP), Secure File Transfer Protocol (SFTP), and/or Pretty Good Privacy (PGP) encryption. In many embodiments, one or more web services may be implemented within the various computing devices. Web services may be accessed by authorized external devices and users to support input, extraction, and manipulation of data between the various computing devices in the system 100. Web services built to support a personalized display system may be cross-domain and/or cross-platform, and may be built for enterprise use. Data may be transmitted using the Secure Sockets Layer (SSL) or Transport Layer Security (TLS) protocol to provide secure connections between the computing devices. Web services may be implemented using the WS-Security standard, providing for secure SOAP messages using XML encryption. Specialized hardware may be used to provide secure web services. For example, secure network appliances may include built-in features such as hardware-accelerated SSL and HTTPS, WS-Security, and/or firewalls. Such specialized hardware may be installed and configured in the system 100 in front of one or more computing devices such that any external devices may communicate directly with the specialized hardware.

Figure 2:
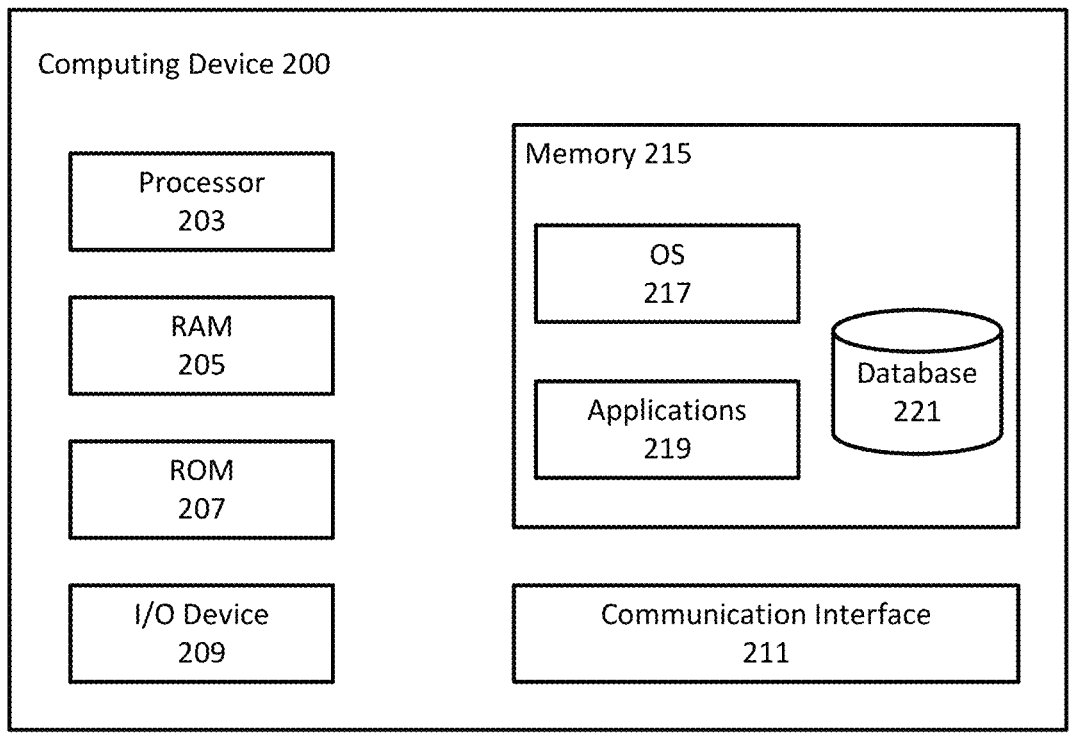
FIG. 2 shows an example computing device in accordance with one or more aspects described herein.

Turning now to FIG. 2, a computing device 200 that may be used with one or more of the computational systems is described. The computing device 200 may include a processor 203 for controlling overall operation of the computing device 200 and its associated components, including RAM 205, ROM 207, input/output device 209, communication interface 211, and/or memory 215. A data bus may interconnect processor(s) 203, RAM 205, ROM 207, memory 215, I/O device 209, and/or communication interface 211. In some embodiments, computing device 200 may represent, be incorporated in, and/or include various devices such as a desktop computer, a computer server, a mobile device, such as a laptop computer, a tablet computer, a smart phone, any other types of mobile computing devices, and the like, and/or any other type of data processing device.

Input/output (I/O) device 209 may include a microphone, keypad, touch screen, and/or stylus through which a user of the computing device 200 may provide input, and may also include one or more of a speaker for providing audio output and a video display device for providing textual, audiovisual, and/or graphical output. Software may be stored within memory 215 to provide instructions to processor 203 allowing computing device 200 to perform various actions. For example, memory 215 may store software used by the computing device 200, such as an operating system 217, application programs 219, and/or an associated internal database 221. The various hardware memory units in memory 215 may include volatile and nonvolatile, removable and non-removable media implemented in any method or technology for storage of information such as computer-readable instructions, data structures, program modules, or other data. Memory 215 may include one or more physical persistent memory devices and/or one or more non-persistent memory devices. Memory 215 may include, but is not limited to, random access memory (RAM) 205, read only memory (ROM) 207, electronically erasable programmable read only memory (EEPROM), flash memory or other memory technology, optical disk storage, magnetic cassettes, magnetic tape, magnetic disk storage or other magnetic storage devices, or any other medium that may be used to store the desired information and that may be accessed by processor 203.

Communication interface 211 may include one or more transceivers, digital signal processors, and/or additional circuitry and software for communicating via any network, wired or wireless, using any protocol as described herein.

Processor 203 may include a single central processing unit (CPU), which may be a single-core or multi-core processor, or may include multiple CPUs. Processor(s) 203 and associated components may allow the computing device 200 to execute a series of computer-readable instructions to perform some or all of the processes described herein. Although not shown in FIG. 2, various elements within memory 215 or other components in computing device 200, may include one or more caches, for example, CPU caches used by the processor 203, page caches used by the operating system 217, disk caches of a hard drive, and/or database caches used to cache content from database 221. For embodiments including a CPU cache, the CPU cache may be used by one or more processors 203 to reduce memory latency and access time. A processor 203 may retrieve data from or write data to the CPU cache rather than reading/writing to memory 215, which may improve the speed of these operations. In some examples, a database cache may be created in which certain data from a database 221 is cached in a separate smaller database in a memory separate from the database, such as in RAM 205 or on a separate computing device. For instance, in a multi-tiered application, a database cache on an application server may reduce data retrieval and data manipulation time by not needing to communicate over a network with a back-end database server. These types of caches and others may be included in various embodiments, and may provide potential advantages in certain implementations of devices, systems, and methods described herein, such as faster response times and less dependence on network conditions when transmitting and receiving data.

Although various components of computing device 200 are described separately, functionality of the various components may be combined and/or performed by a single component and/or multiple computing devices in communication without departing from the invention.

Figure 3:
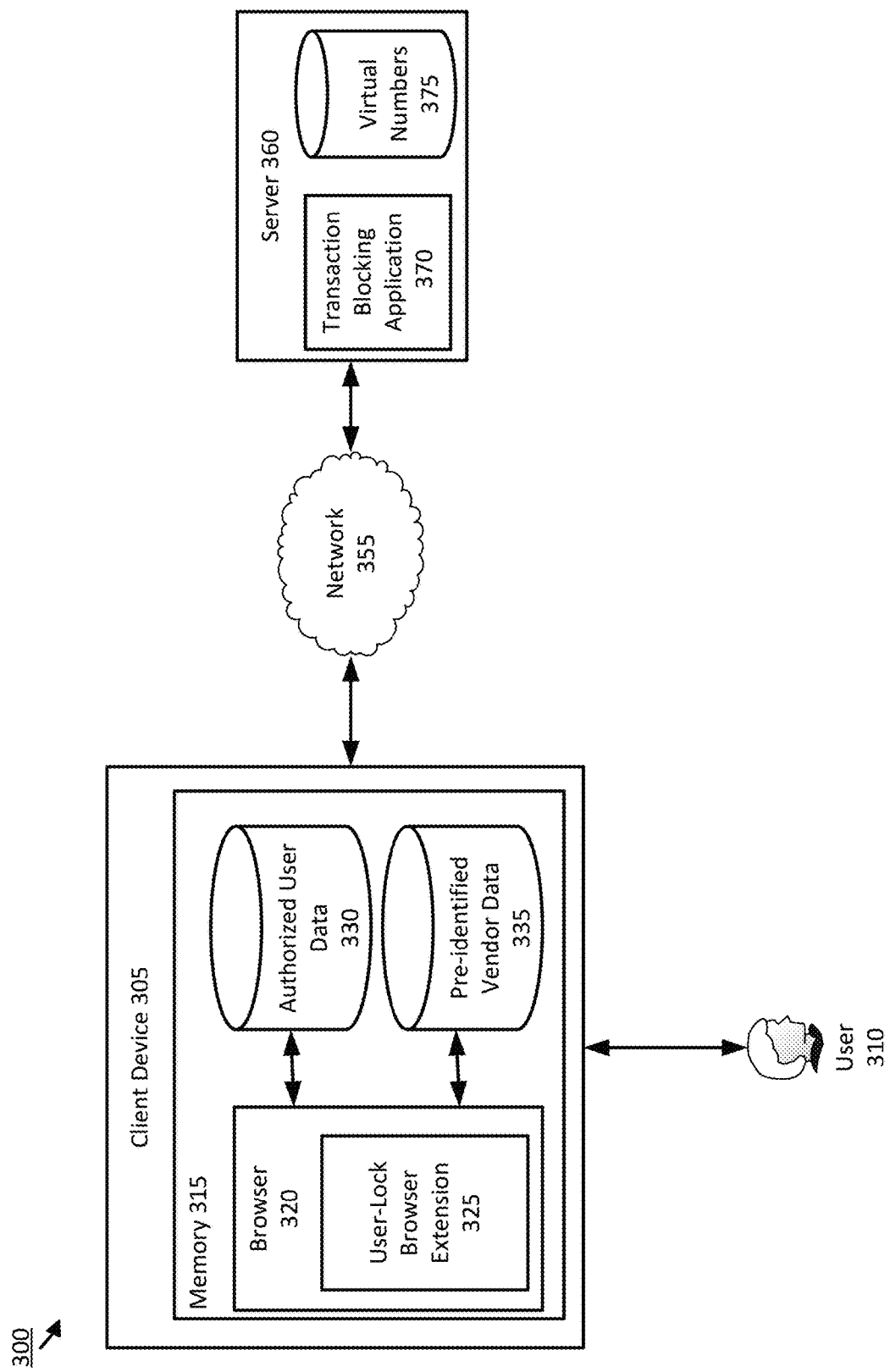
FIG. 3 shows an example system that provides a user-lock browser extension in accordance with one or more aspects described herein.

FIG. 3 shows an example system 300 for providing a user-locking browser extension according to one or more aspects of the disclosure. The system 300 may comprise a client device 305. The client device 305 may be a computing device, such as the computing device 200 shown in FIG. 2. The client device 305 may comprise a memory 315. The memory 315 may comprise one or more applications, such as the browser 320. A browser extension, such as the user-lock browser extension 325, may be associated with the browser 320. The user-lock browser extension 325 may comprise HTML, JavaScript, and/or CSS and may be integrated with the browser 320.

The memory 315 of the client device 305 may also comprise an authorized user data 330 and/or a pre-identified vendor data 335. An account holder associated with a financial account may specify one or more users authorized to perform financial transactions associated with the financial account of the account holder. Specifying an authorized user may comprise capturing biometric information for the user. The authorized user data 330 may comprise biometric information for one or more users authorized by an account holder of a financial account to perform an online transaction with an online vendor and the financial account.

The user-lock browser extension 325 may configure the browser 320 to monitor the browser activity for the browser 320. For example, the browser 320 may monitor for whether a web page has been accessed within the browser 320. The pre-identified vendor data 335 may comprise a plurality of websites or a plurality of online vendors pre-identified for monitoring. The pre-identified online vendors and/or websites may be specified by a user, such as a parent or a financial account holder. For example, a parent may prevent a child from accessing or viewing content of certain websites by specifying these as pre-identified websites. As another example, an account holder may specify vendors and websites in order to prevent unauthorized financial transactions with the specified vendors and/or websites and associated with the account holder's financial account.

The user-lock browser extension 325 may determine whether the web page accessed by the user 310 is associated with at least one of the websites and/or online vendors in the pre-identified vendor data 335. The user-lock browser extension 325 may configure the browser 320 to, based on a determination that the web page is associated with a pre-identified online vendor or website, monitor the activity of the user 310 within the web page. The user-lock browser extension 325 may configure the browser 320 to detect, based on the monitored activity of the user 310 within the web page, an attempt by the user 310 to perform a financial transaction with the pre-identified online vendor and associated with the financial account.

The user-lock browser extension 325 may configure the browser 320 to capture biometric information associated with the user 310. The captured biometric information associated with the user 310 may comprise at least one image of a face of the user 310 of the browser 320. The biometric information associated with the user 310 of the browser 320 may be captured periodically. The user-lock browser extension 325 may determine, based on the captured biometric information and the authorized user data 330, whether the user 310 is authorized to perform a financial transaction with the online vendor and associated with the financial account. The user-lock browser extension 325 may configure the browser 320 to modify, based on a determination that the user 310 is not authorized to perform the financial transaction, at least one element of the web page to block the user 310 from performing the financial transaction with the online vendor. The user-lock browser extension 325 may configure the browser 320 to modify, based on a determination that the user 310 is authorized to perform the financial transaction, at least one element of the web page to enable the user 310 to perform the financial transaction with the online vendor. The modifying may comprise disabling one or more user selectable options in the web page. The modifying may comprise hiding one or more portions of content of the web page. The modifying may comprise disabling a plurality of user interactive features of the web page. The modifying may be based on modifying a Document Object Model (DOM) representation of the web page.

In some implementations, the user-lock browser extension 325 may configure the browser 320 to capture, periodically and after modifying the at least one element of the webpage, biometric information associated with a current user of the browser 320. The user-lock browser extension 325 may determine, based on the captured biometric information associated with the current user of the browser 320, whether the user 310 is continuing to use the browser 320. The user-lock browser extension 325 may enable, based on a determination that the user 310 has ceased using the browser 320, the plurality of user interactive features of the web page.

The user-lock browser extension 325 may configure the browser 320 to send, based on the determination that the user 310 is unauthorized, a notification of the attempted financial transaction to the account holder associated with the financial account. The notification sent may comprise at least a portion of the captured biometric information of the user 310. The user-lock browser extension 325 may configure the browser 320 to notify the user 310 that the user 310 is unauthorized to perform the attempted financial transaction.

The system 300 may also comprise a server 360. The client device 305 may connect to the server 360 via the network 355. The server 360 may be a computing device, such as the computing device 200 shown in FIG. 2. The server 360 may comprise a memory that comprises one or more applications, such as a transaction blocking application 370. The memory of the server 360 may also comprise a database, such as the virtual account numbers 375. The virtual account numbers 375 may comprise a plurality of virtual account numbers assigned to a financial account of an account holder. The virtual account numbers may correspond respectively to a plurality of online vendors. A transaction with an online vendor and the financial account may be based on the assigned virtual account number corresponding to the online vendor. A transaction with an online vendor and the financial account may be blocked by disabling the corresponding assigned virtual account number. Additionally, a transaction with an online vendor and the financial account may be allowed by enabling the corresponding assigned virtual account number.

The server 360 may receive a notification that a user, such as the user 310, of a browser, such as the browser 320, executing on the client device 305 is attempting to perform a financial transaction with an online vendor. The notification may comprise information about whether the user 310 is authorized or unauthorized. Based on the notification, the transaction blocking application 370 may determine whether to allow or block the transaction. The transaction blocking application 370 may allow the attempted financial transaction by enabling a virtual account number 375 corresponding to the online vendor. The transaction blocking application 370 may block the attempted financial transaction by disabling the virtual account number 375 corresponding to the online vendor. Blocking the attempted transaction may also comprise disabling at least one user selectable option displayed by the browser 320, or hiding at least a portion of web page content from being displayed within the browser 320. The transaction blocking application 370 may cause a notification to be sent from the server 360 to the account holder of the blocked or allowed transaction.

Figure 4A:
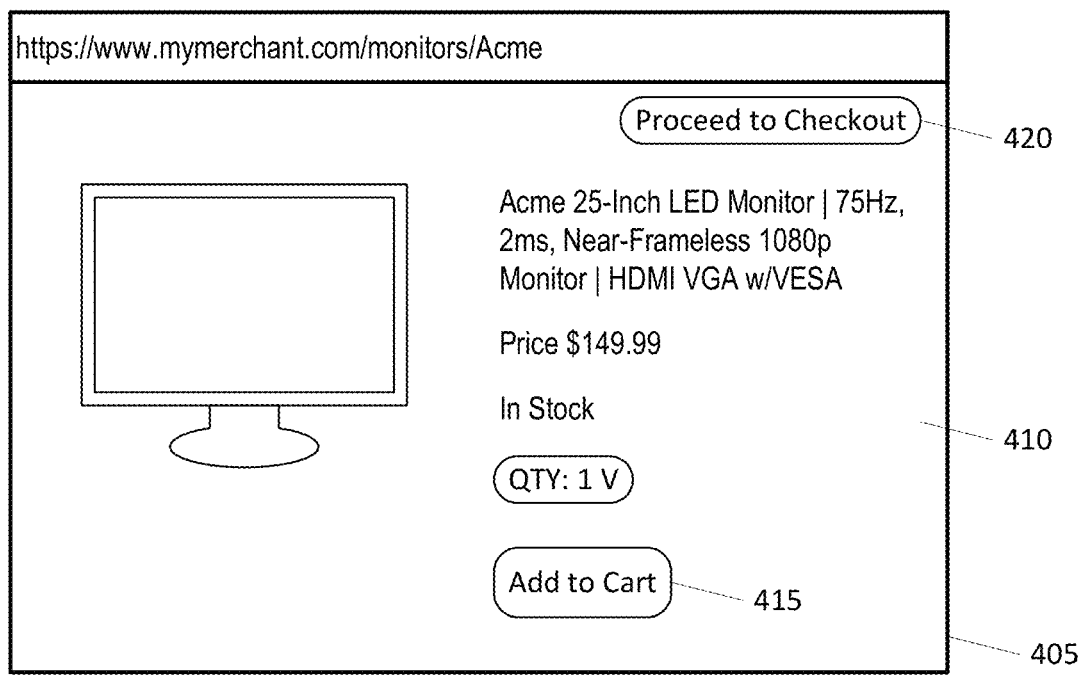
FIG. 4A shows an example of a webpage that may be displayed by a browser.
Figure 4B:
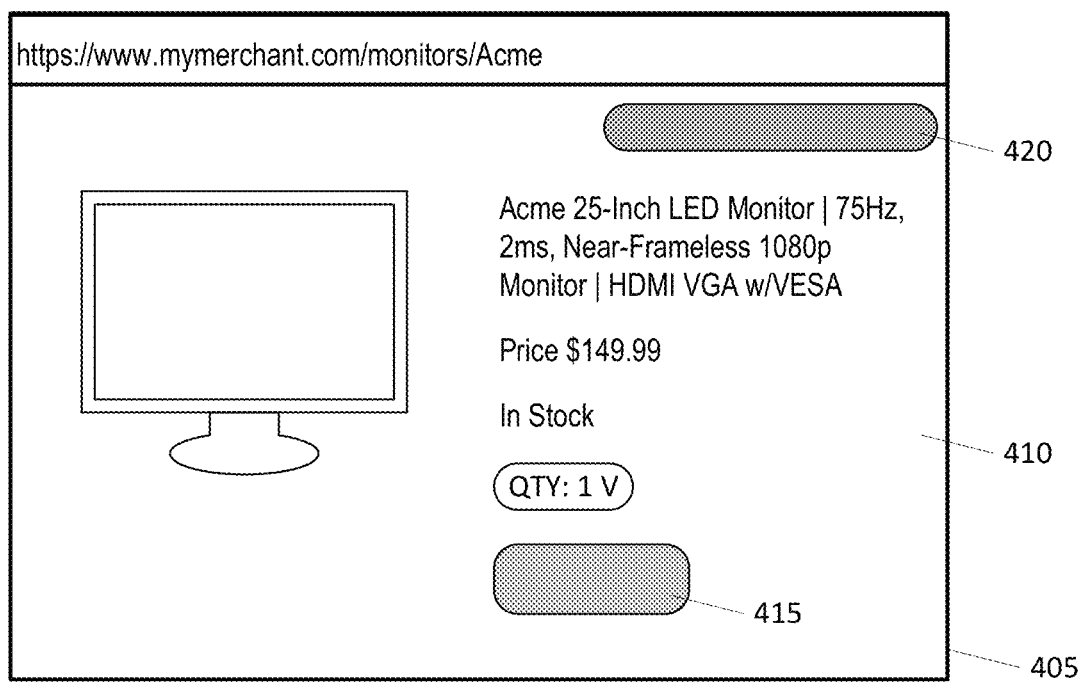
FIG. 4B shows an example of the web page in FIG. 4A after a transaction is blocked.

FIG. 4A shows a product web page 410 within a browser window 405. The product web page 405 includes multiple web page elements associated with purchasing the displayed product, such as a "Proceed to Checkout" element 420, and an "Add to Cart" element 415. FIG. 4B shows the product web page 410 from FIG. 4A after a determination that the user 310 is not authorized to perform a financial transaction with the online vendor and associated with the financial account. For example, the user-lock browser extension 325 may configure the browser 320 to hide or disable the "Proceed to Checkout" element 420, and the "Add to Cart" element 415 by modifying a Document Object Model (DOM) representation of the web page 410.

Figure 5:
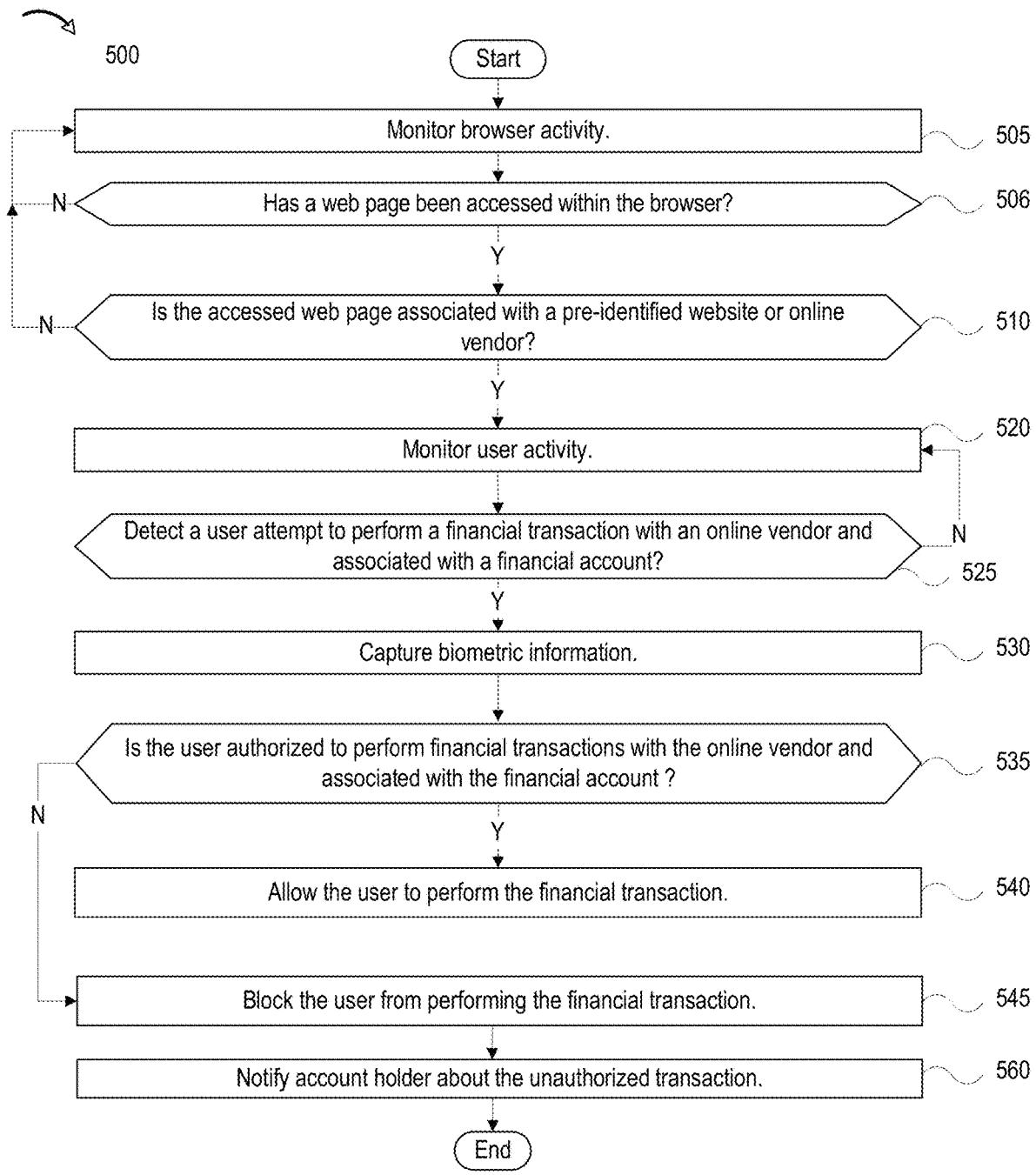
FIG. 5 shows a flow diagram of an example method for allowing or blocking a financial transaction utilizing a user-lock browser extension.

FIG. 5 is a flow diagram showing steps of an example method 500 for blocking or allowing a financial transaction attempted by the user 310 within the browser 320. The steps of the method 500 may be performed by the user-lock browser extension 320, the transaction blocking application 370, and/or the browser 320, shown in FIG. 3. Alternatively or additionally, some or all of the steps of the method 500 may be performed by one or more other computing devices. The steps of the method 500 may be modified, omitted, and/or performed in other orders, and/or other steps added.

At step 505, a client device (e.g., the browser 320 executing on the client device 305) may monitor browser activity within the browser 320. The browser activity may include detecting whether a web page has been accessed or downloaded within the browser 320. At step 506, the browser 320 may evaluate whether the accessing of a web page has been detected. Based on a determination that a web page has not been accessed within the browser 320, the client device (e.g., browser 320 executing on client device 305) may continue monitoring browser activity by returning to step 505.

Based on a determination that a web page has been accessed within the browser 320, the browser 320 executing on client device 305 may proceed to step 510. At step 510, the browser 320 executing on client device 305 may determine, based on the pre-identified vendor data 335, whether the web page accessed by the user 310 is associated with at least one of the websites or online vendors in the pre-identified vendor data 335. Based on determining that the accessed web page is not associated with at least one of the websites or online vendors in the pre-identified vendor data 335, the browser 320 executing on client device 305 may return to step 505 and continue to monitor browser activity. However, based on determining the accessed web page is not associated with at least one of the websites or online vendors in the pre-identified vendor data 335, the browser 320 executing on client device 305 may proceed to step 520.

At step 520, the client device (e.g. the browser 320 executing on client device 305) may monitor the activity of the user 310 within the accessed web page in order to detect whether the user 310 is attempting to perform a financial transaction with an online vendor and/or associate with the financial account. At step 525, the client device (e.g., the browser 320 executing on client device 305) may, based on an evaluation of the monitored activity of the user 310 within the web page, determine whether the user 310 is attempting to perform a financial transaction with an online vendor and/or associated with the financial account. The online vendor may be different from a pre-identified online vendor. The browser 320 may determine an attempt to perform a financial transaction based on evaluating one or more aspects of the web page content. For example, as the user 310 navigates the web page content, the client device (e.g., the browser 320 executing on client device 305) may determine whether the displayed web page content comprises one or more web page elements associated with purchasing an item or service. User activity indicative of an attempt to perform a financial transaction may also include, for example, the user 310 adding an item for sale to an online cart, wish list, etc.

Based on a determination that the user 310 is attempting to perform a financial transaction with an online vendor and associated with the financial account, the client device (e.g., the browser 320 executing on client device 305) may, at step 530, capture biometric information associated with the user 310. The captured biometric information may comprise at least one image of a face of the user 310 of the browser 320. The biometric information may be a voice sample, a fingerprint, and/or retinal scanned information. The biometric information may be captured continuously for the remainder of the session time period or periodically during the session time period, for example, every 60 seconds. The biometric information may also be captured based on an intermittent heartbeat signal.

At step 535, the client device (e.g., the browser 320 executing on client device 305) may determine, based on the captured biometric information and the authorized user data 330, whether the user 310 is authorized to perform a financial transaction with the online vendor and associated with the financial account. The captured biometric information may be compared to the stored authorized user data 330. The browser 320 may determine that the user 310 is authorized if there is a match between the captured biometric data and corresponding biometric information for the user 310 in the authorized user data 330.

At step 540, the client device (e.g. the browser 320 executing on client device 305) may modify, based on a determination that the user 310 is not authorized to perform a financial transaction, at least one element of the web page to block the user 310 from performing the financial transaction. At step 545, the client device (e.g., browser 320 executing on client device 305) may modify, based on a determination that the user 310 is authorized to perform the financial transaction, at least one element of the web page to enable the user 310 to perform the financial transaction with the online vendor. The modifying may comprise disabling one or more user selectable options in the web page. The modifying may comprise hiding one or more portions of content of the web page. The modifying may comprise disabling a plurality of user interactive features of the web page. The modifying may be based on modifying a DOM representation of the web page.

The client device (e.g., browser 320 executing on client device 305) may capture, periodically after modifying the at least one element of the webpage, biometric information associated with a current user of the browser 320. The user-lock browser extension 325 may determine, based on the captured biometric information associated with the current user of the browser 320, whether the user 310 is continuing to use the browser 320. The user-lock browser extension 325 may enable, based on a determination that the user 310 has ceased using the browser 320, the plurality of user interactive features of the web page.

In some implementations, the browser 320 executing on client device 305 may request authorization from an authorized user. For example, the browser 320 may display a message for the user 310 that the currently blocked attempted transaction may be allowed in the presence of an authorized user. Based on the user 310 indicating that an authorized user is present, the browser 320 may capture the user biometric information again. Based on a determination that an authorized user is present in addition to the unauthorized user 310, the browser 320 may allow the transaction.

At step 560, the client device (e.g., browser 320 executing on client device 305) may send, based on the determination that the user 310 is unauthorized, a notification of the attempted financial transaction to the account holder associated with the financial account. The notification may comprise at least a portion of the captured biometric information of the user 310. The browser 320 may also notify the user 310 that the user 310 is unauthorized to perform the attempted financial transaction.

Figure 6:
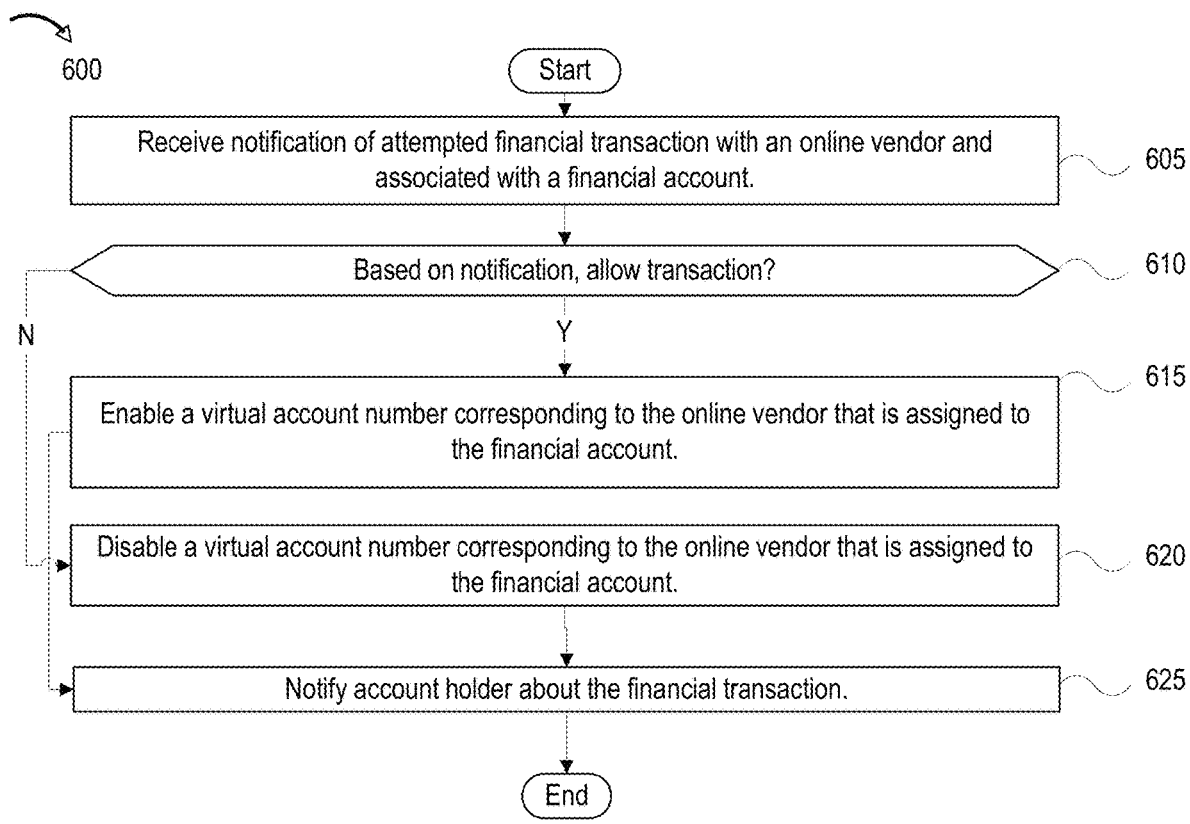
FIG. 6 shows a flow diagram of another example method for allowing or blocking a financial transaction.

FIG. 6 is a flow diagram showing steps of an example method 600 for blocking or allowing a financial transaction attempted by the user 310 within the browser 320. The steps of the method 600 may be performed by the user-lock browser extension 320, the transaction blocking application 370, and/or the browser 320, shown in FIG. 3. Alternatively or additionally, some or all of the steps of the method 600 may be performed by one or more other computing devices. The steps of the method 600 may be modified, omitted, and/or performed in other orders, and/or other steps added.

At step 605, the server 360 may receive a notification of an attempted financial transaction with an online vendor and/or associated with a financial account. The notification may comprise information about whether the user 310 is authorized or unauthorized. At step 610, based on an evaluation of the notification, the server (e.g., transaction blocking application 370 executing on server 360) may determine whether to allow or block the financial transaction. Based on a determination to allow the financial transaction, the server (e.g., transaction blocking application 370 executing on server 360) may, at step 615, enable a virtual account number 375 corresponding to the online vendor that is assigned to the financial account. Based on a determination to block the financial transaction, the server (e.g., transaction blocking application 370 executing on server 360) may, at step 620, disable the virtual account number 375 corresponding to the online vendor that is assigned to the financial account. At step 625, the server (e.g., transaction blocking application 370 executing on server 360) may cause a notification to be sent from the server 360 to the account holder of the blocked or allowed transaction.

One or more aspects discussed herein may be embodied in computer-usable or readable data and/or computer-executable instructions, such as in one or more program modules, executed by one or more computers or other devices as described herein. Generally, program modules include routines, programs, objects, components, data structures, and the like. that perform particular tasks or implement particular abstract data types when executed by a processor in a computer or other device. The modules may be written in a source code programming language that is subsequently compiled for execution, or may be written in a scripting language such as (but not limited to) HTML or XML. The computer executable instructions may be stored on a computer readable medium such as a hard disk, optical disk, removable storage media, solid-state memory, RAM, and the like. As will be appreciated by one of skill in the art, the functionality of the program modules may be combined or distributed as desired in various embodiments. In addition, the functionality may be embodied in whole or in part in firmware or hardware equivalents such as integrated circuits, field programmable gate arrays (FPGA), and the like. Particular data structures may be used to more effectively implement one or more aspects discussed herein, and such data structures are contemplated within the scope of computer executable instructions and computer-usable data described herein. Various aspects discussed herein may be embodied as a method, a computing device, a system, and/or a computer program product.

Although the present invention has been described in certain specific aspects, many additional modifications and variations would be apparent to those skilled in the art. In particular, any of the various processes described above may be performed in alternative sequences and/or in parallel (on different computing devices) in order to achieve similar results in a manner that is more appropriate to the requirements of a specific application. It is therefore to be understood that the present invention may be practiced otherwise than specifically described without departing from the scope and spirit of the present invention. Thus, embodiments of the present invention should be considered in all respects as illustrative and not restrictive. Accordingly, the scope of the invention should be determined not by the embodiments illustrated, but by the appended claims and their equivalents.

What is claimed is:

1. A computer-implemented method, comprising:
   monitoring, by a browser and based on a determination that a first web page is associated with at least one of a plurality of websites or a plurality of online vendors pre-selected for monitoring, activity of a first user within the first web page displayed by the browser;
   detecting, by the browser and based on the monitoring, an attempt, by the first user, to perform a first financial transaction with an online vendor and associated with a financial account;
   capturing, by the browser and based on the detecting, biometric information associated with the first user;
   determining, by the browser and based on the captured biometric information, whether the first user is authorized to perform financial transactions with the online vendor and associated with the financial account;
   modifying, by the browser and based on a determination that the first user is not authorized to perform the first financial transaction, a Document Object Model (DOM) representation of the first web page to block the first user from performing the first financial transaction with the online vendor;
   periodically capturing, after modifying the DOM representation of the first web page, biometric information associated with a current user of the browser;

determining, by the browser and based on the captured biometric information associated with the current user, whether the first user is continuing to use the browser; and enabling, by the browser and based on a determination that the first user has ceased using the browser, the DOM representation of the first web page.

2. The computer-implemented method of claim 1, further comprising:

detecting, by the browser and based on monitoring user activity of a second user, an attempt to perform a second financial transaction, on a second web page, with the online vendor and associated with the financial account;

capturing, by the browser and based on the detecting the attempt to perform the second financial transaction, biometric information associated with the second user;

determining, by the browser and based on the captured biometric information, whether the second user is authorized to perform financial transactions with the online vendor and associated with the financial account; and modifying, by the browser and based on a determination that the second user is authorized to perform the second financial transaction, at least one element of the second web page to enable the second user to perform the second financial transaction.

3. The computer-implemented method of claim 1, further comprising:

detecting, by the browser and based on monitoring user activity of a second user, an attempt to perform a second financial transaction with the online vendor and associated with the financial account;

capturing, by the browser and based on the detecting the attempt to perform the second financial transaction, biometric information associated with the second user;

determining, by the browser and based on the captured biometric information, whether the second user is authorized to perform a financial transaction with the online vendor and associated with the financial account; and allowing, by the browser and based on a determination that the second user is authorized to perform the second transaction, the second financial transaction.

4. The computer-implemented method of claim 1, further comprising:

modifying at least one element of the first web page by:
 disabling one or more user selectable options in the first web page; or
 hiding one or more portions of content of the first web page.

5. The computer-implemented method of claim 1, further comprising:

sending, by the browser and based on the determination that the first user is not authorized, a notification of the attempt to perform the first financial transaction to an account holder associated with the financial account.

6. The computer-implemented method of claim 5, wherein the notification sent to the account holder comprises at least a portion of the captured biometric information.

7. The computer-implemented method of claim 1, wherein the captured biometric information comprises at least one of an image of a face of the first user, a voice sample provided by the first user, a retinal scan of the first user, or a fingerprint provided by the first user.

8. The computer-implemented method of claim 1, wherein determining whether the first user is authorized is based on the captured biometric information and biometric data associated with one or more users that are pre-authorized to perform one or more financial transactions with the online vendor and associated with the financial account.

9. The method of claim 1, further comprising:

notifying, by the browser and based on the determination that the first user is not authorized, the first user that the first user is unauthorized to perform the first financial transaction.

10. The method of claim 1, wherein the biometric information associated with the first user is captured periodically.

11. The method of claim 1, further comprising:

disabling a plurality of user interactive features of the first web page.

12. The method of claim 8, wherein the biometric data associated with the one or more users pre-authorized to perform one or more financial transactions with the online vendor and associated with the financial account is stored in a memory of a user device executing the browser.

13. A computing device comprising:

one or more processors; and memory storing instructions that, when executed by the one or more processors, cause the computing device to:

monitor, by a browser and based on a determination that a first web page is associated with at least one of a plurality of websites or a plurality of online vendors pre-selected for monitoring, activity of a first user within the first web page displayed by the browser;

detect, by the browser and based on the monitoring, an attempt, by the first user, to perform a first financial transaction with an online vendor and associated with a financial account;

capture, by the browser and based on the detecting, biometric information associated with the first user;

determine, by the browser and based on the captured biometric information, whether the first user is authorized to perform financial transactions with the online vendor and associated with the financial account; and modify, by the browser and based on a determination that the first user is not authorized to perform the first financial transaction, a Document Object Model (DOM) representation of the first web page to block the first user from performing the first financial transaction with the online vendor;

periodically capture, after modifying the DOM representation of the first web page, biometric information associated with a current user of the browser;

determine, by the browser and based on the captured biometric information associated with the current user, whether the first user is continuing to use the browser; and enable, by the browser and based on a determination that the first user has ceased using the browser, the DOM representation of the first web page.

14. The computing device of claim 13, wherein the instructions, when executed by the one or more processors, cause the computing device to:

send, by the browser and based on the determination that the first user is not authorized, a notification of the attempt to perform the first financial transaction to an account holder associated with the financial account, wherein the notification sent to the account holder comprises at least a portion of the captured biometric information.

15. The computing device of claim 13, wherein the captured biometric information comprises at least one of an image of a face of the first user, a voice sample provided by the first user, a retinal scan of the first user, or a fingerprint provided by the first user.

16. The computing device of claim 13, wherein the instructions, when executed by the one or more processors, cause the computing device to:
notify, by the browser and based on the determination that the first user is not authorized, the first user that the first user is unauthorized to perform the first financial transaction.

17. A non-transitory computer readable medium comprising instructions that, when executed, configure a computing device to:
monitor, by a browser and based on a determination that a first web page is associated with at least one of a plurality of websites or a plurality of online vendors pre-selected for monitoring, activity of a first user within the first web page displayed by the browser;
detect, by the browser and based on the monitoring, an attempt, by the first user, to perform a first financial transaction with an online vendor and associated with a financial account;
capture, by the browser and based on the detecting, biometric information associated with the first user;
determine, by the browser and based on the captured biometric information, whether the first user is authorized to perform financial transactions with the online vendor and associated with the financial account; and
modify, by the browser and based on a determination that the first user is not authorized to perform the first financial transaction, a Document Object Model (DOM) representation of the first web page to block the first user from performing the first financial transaction with the online vendor;
periodically capture, after modifying the DOM representation of the first web page, biometric information associated with a current user of the browser;
determine, by the browser and based on the captured biometric information associated with the current user, whether the first user is continuing to use the browser; and
enable, by the browser and based on a determination that the first user has ceased using the browser, the DOM representation of the first web page.

18. The non-transitory computer readable medium of claim 17, wherein the instructions, when executed, configure the computing device to:
send, by the browser and based on the determination that the first user is not authorized, a notification of the attempt to perform the first financial transaction to an account holder associated with the financial account, wherein the notification sent to the account holder comprises at least a portion of the captured biometric information.

19. The non-transitory computer readable medium of claim 17, wherein the captured biometric information comprises at least one of an image of a face of the first user, a voice sample provided by the first user, a retinal scan of the first user, or a fingerprint provided by the first user.

20. The non-transitory computer readable medium of claim 17, wherein the instructions, when executed, configure the computing device to:
notify, by the browser and based on the determination that the first user is not authorized, the first user that the first user is unauthorized to perform the first financial transaction.

* * * * *